United States Patent [19]
Nakayama

[11] Patent Number: 5,349,679
[45] Date of Patent: Sep. 20, 1994

[54] COMMUNICATION CONTROL UNIT FOR SELECTING A CONTROL MODE OF DATA COMMUNICATION AND SELECTIVELY BYPASSING AN INTERPROCESSOR INTERFACE

[75] Inventor: Mikio Nakayama, Tokyo, Japan

[73] Assignee: Fujitsu Limited, Kawasaki, Japan

[21] Appl. No.: 750,827

[22] Filed: Aug. 27, 1991

[30] Foreign Application Priority Data

Aug. 28, 1990 [JP] Japan .................. 2-225973

[51] Int. Cl.⁵ .................................. G06F 3/00
[52] U.S. Cl. .................. 395/800; 364/240.7; 364/260; 364/238.2; 364/232.9; 364/DIG. 1; 395/325
[58] Field of Search ............... 395/800, 325; 364/240.7

[56] References Cited

U.S. PATENT DOCUMENTS

| | | | |
|---|---|---|---|
| 4,490,785 | 12/1984 | Strecker | 395/325 |
| 4,744,078 | 5/1988 | Kowalczyk | 370/85 |
| 4,975,838 | 12/1990 | Mizuno | 395/275 |
| 5,140,691 | 8/1992 | Austruy | 395/575 |
| 5,297,260 | 3/1994 | Kametani | 395/325 |

Primary Examiner—Eric Coleman

[57] ABSTRACT

A communication control unit includes a central processing unit, a peripheral circuit part for operating the central processing unit, a line interface part for carrying out a call control, a data communication part for controlling a data terminal, a line system bus which couples the central processing unit, the peripheral circuit part and the line interface part, a data system bus which is coupled to the data communication part, an interprocessor interface part which is coupled to the data communication part, and a bus selector part which is coupled to the line system bus, the data communication part and the interprocessor interface part. The bus selector part bypasses the interprocessor interface part and couples the line system bus to the data communication part in a single mode in which the central processing unit controls both the line interface part and the data communication part, and said bus selector part couples the line system bus to the data communication part via the interprocessor interface part in a multi mode in which the central processing unit controls the line interface part and another central processing unit controls the data communication part via the data system bus.

32 Claims, 16 Drawing Sheets

COMMUNICATION CONTROL UNIT FOR SELECTING A CONTROL MODE OF DATA COMMUNICATION AND SELECTIVELY BYPASSING AN INTERPROCESSOR INTERFACE

BACKGROUND OF THE INVENTION

The present invention generally relates to communication control units, and more particularly to a communication control unit which can select a control mode of data communication.

Recently, there are increasing demands for data communication due to developments of an integrated services digital network (ISDN) and the like.

In data communications, the call control is carried out by a line interface part, and the control of a data terminal is carried out by a data communication part. The line interface part and the data communication part are both controlled by a central processing unit (CPU).

By the progress in large scale integrated circuit (LSI) technology and application specific integrated circuit (ASIC) technology which is used to form a plurality of circuits on a single semiconductor chip, there is a proposed communication controller which integrally comprises various circuits such as the line interface part and the data communication part with the CPU provided as a core.

On the other hand, there are various types of data communication, including simple and complex data communication. For example, the control of the line interface part and the control of the data communication part may be carried out by independent CPUs or by a single CPU. For this reason, when designing the communication control unit in which the various circuits such as the line interface part and the data communication part are integrated using the CPU as the core, the architecture must be flexible so that the communication control unit can cope with various data terminals such as a data terminal which uses a complicated procedure and has a large number of functions, a data terminal which uses a simple procedure and has a relatively small number of functions and a data terminal having a plurality of ports. In this specification, the data terminal which uses the complicated procedure and has the relatively large number of functions will be referred to as a complex data terminal, and the data terminal which uses the simple procedure and has the relatively small number of functions will be referred to as a simple data terminal.

FIG. 1 shows an example of a conventional communication control unit. The communication control unit includes CPUs 101 and 102, a line interface part 103 which makes a call control, a data communication part 104 for controlling a data terminal, and an interprocessor interface part 105 which is provided between the line interface part 103 and the data communication part 104. For example, the interface part 105 includes a dual port random access memory (RAM).

The line interface part 103 is controlled by the CPU 101, but the data communication part 104 is controlled by the other CPU 102. A communication between the CPUs 101 and 102 is carried out via the interface part 105.

However, according to the communication control unit shown in FIG. 1, there is a problem in that the two CPUs 101 and 102 are required even for a data communication which uses a simple procedure. In addition, there is a problem in that the communication control unit cannot be used when realizing a plurality of data communications.

SUMMARY OF THE INVENTION

Accordingly, it is a general object of the present invention to provide a novel and useful communication control unit in which the problems described above are eliminated.

Another and more specific object of the present invention is to provide a communication control unit comprising a central processing unit, a peripheral circuit part for operating the central processing unit, a line interface part for carrying out a call control, a data communication part for controlling a data terminal, a line system bus which couples the central processing unit, the peripheral circuit part and the line interface part, a data system bus which is coupled to the data communication part, an interprocessor interface part which is coupled to the data communication part, and a bus selector part which is coupled to the line system bus, the data communication part and the interprocessor interface part, where the bus selector part bypasses the interprocessor interface part and couples the line system bus to the data communication part in a single mode in which the central processing unit controls both the line interface part and the data communication part, and the bus selector part couples the line system bus to the data communication part via the interprocessor interface part in a multi mode in which the central processing unit controls the line interface part and another central processing unit controls the data communication part via the data system bus. According to the communication control unit of the present invention, it is possible to cope with various types of data terminals, including a data terminal which uses a simple procedure and a data terminal which uses a complicated procedure.

Still another object of the present invention is to provide a communication control unit comprising a central processing unit, a peripheral circuit part for operating the central processing unit, a line interface part for carrying out a call control, a data communication part for controlling a data terminal, a line system bus which couples the central processing unit, the peripheral circuit part and the line interface part, an interprocessor interface part which is coupled to the data communication part, a first bus selector part which is coupled to the line system bus, the data communication part and the interprocessor interface part, a second bus selector part which is coupled to the first bus selector part, the interprocessor interface part and the data communication part, and a data system bus which is coupled to the second bus selector part, where the first bus selector part bypasses the interprocessor interface part and couples the line system bus to the data communication part in a single mode in which the central processing unit controls both the line interface part and the data communication part, the first bus selector part couples the line system bus to the data communication part via the interprocessor interface part in a multi mode in which the central processing unit controls the line interface part and another central processing unit controls the data communication part via the data system bus, the second bus selector part bypasses the interprocessor interface part and coupling the data system bus to the data communication part in the single and multi modes, the second bus selector part couples the data system bus to the data communication part via the interprocessor interface part in a slave mode in which the interprocessor interface part makes a communication with another communication control unit, and the first bus selector part bypasses the interprocessor interface part to couple the line system bus to the data communication part in the slave mode. According to the communication control unit of the present invention, it is possible to cope with various types of data terminals, including a data terminal which uses a simple procedure, a data terminal which uses a complicated procedure and a data terminal which has a plurality of ports.

A further object of the present invention is to provide a communication control system which includes a plurality of communication control units, where each of the communication control units have identical constructions comprising a central processing unit, a peripheral circuit part for operating the central processing unit, a line interface part for carrying out a call control, a data communication part for controlling a data terminal, a line system bus which couples the central processing unit, the peripheral circuit part and the line interface part, an interprocessor interface part which is coupled to the data communication part, a first bus selector part which is coupled to the line system bus, the data communication part and the interprocessor interface part, and a second bus selector part which is coupled to the first bus selector part, the interprocessor interface part and the data communication part, where the first bus selector part bypasses the interprocessor interface part and couples the line system bus to the data communication part in a single mode in which the central processing unit controls both the line interface part and the data communication part, the first bus selector part couples the line system bus to the data communication part via the interprocessor interface part in a multi mode in which the central processing unit controls the line interface part and another central processing unit controls the data communication part via the data system bus, the second bus selector part bypasses the interprocessor interface part and couples the data system bus to the data communication part in the single and multi modes, the second bus selector part couples the data system bus to the data communication part via the interprocessor interface part in a slave mode in which the interprocessor interface part makes a communication with another communication control unit, the first bus selector part bypasses the interprocessor interface part to couple the line system bus to the data communication part in the slave mode, an arbitrary one of the communication control units is used in the multi mode while other remaining communication control units are used in the slave mode, and the line system bus of the arbitrary communication control unit is coupled to the data system buses of the other remaining communication control units.

Another object of the present invention is to provide a communication control system which includes a plurality of communication control units, where each of the communication control units have identical constructions comprising a central processing unit, a peripheral circuit part for operating the central processing unit, a line interface part for carrying out a call control, a data communication part for controlling a data terminal, a line system bus which couples the central processing unit, the peripheral circuit part and the line interface part, an interprocessor interface part which is coupled to the data communication part, a first bus selector part which is coupled to the line system bus, the data communication part and the interprocessor interface part, and a second bus selector part which is coupled to the first bus selector part, the interprocessor interface part and the data communication part, where the first bus selector part bypasses the interprocessor interface part and couples the line system bus to the data communication part in a single mode in which the central processing unit controls both the line interface part and the data communication part, the first bus selector part couples the line system bus to the data communication part via the interprocessor interface part in a multi mode in which the central processing unit controls the line interface part and another central processing unit controls the data communication part via the data system bus, the second bus selector part bypasses the interprocessor interface part and couples the data system bus to the data communication part in the single and multi modes, the second bus selector part couples the data system bus to the data communication part via the interprocessor interface part in a slave mode in which the interprocessor interface part makes a communication with another communication control unit, the first bus selector part bypasses the interprocessor interface part to couple the line system bus to the data communication part in the slave mode, an arbitrary one of the communication control units is used in the multi mode while other remaining communication control units are used in the slave mode, and the line system bus of the arbitrary communication control unit is coupled to the data system buses of the other remaining communication control units.

Other objects and further features of the present invention will be apparent from the following detailed description when read in conjunction with the accompanying drawings,

DESCRIPTION OF THE PREFERRED EMBODIMENTS

Figure 1:
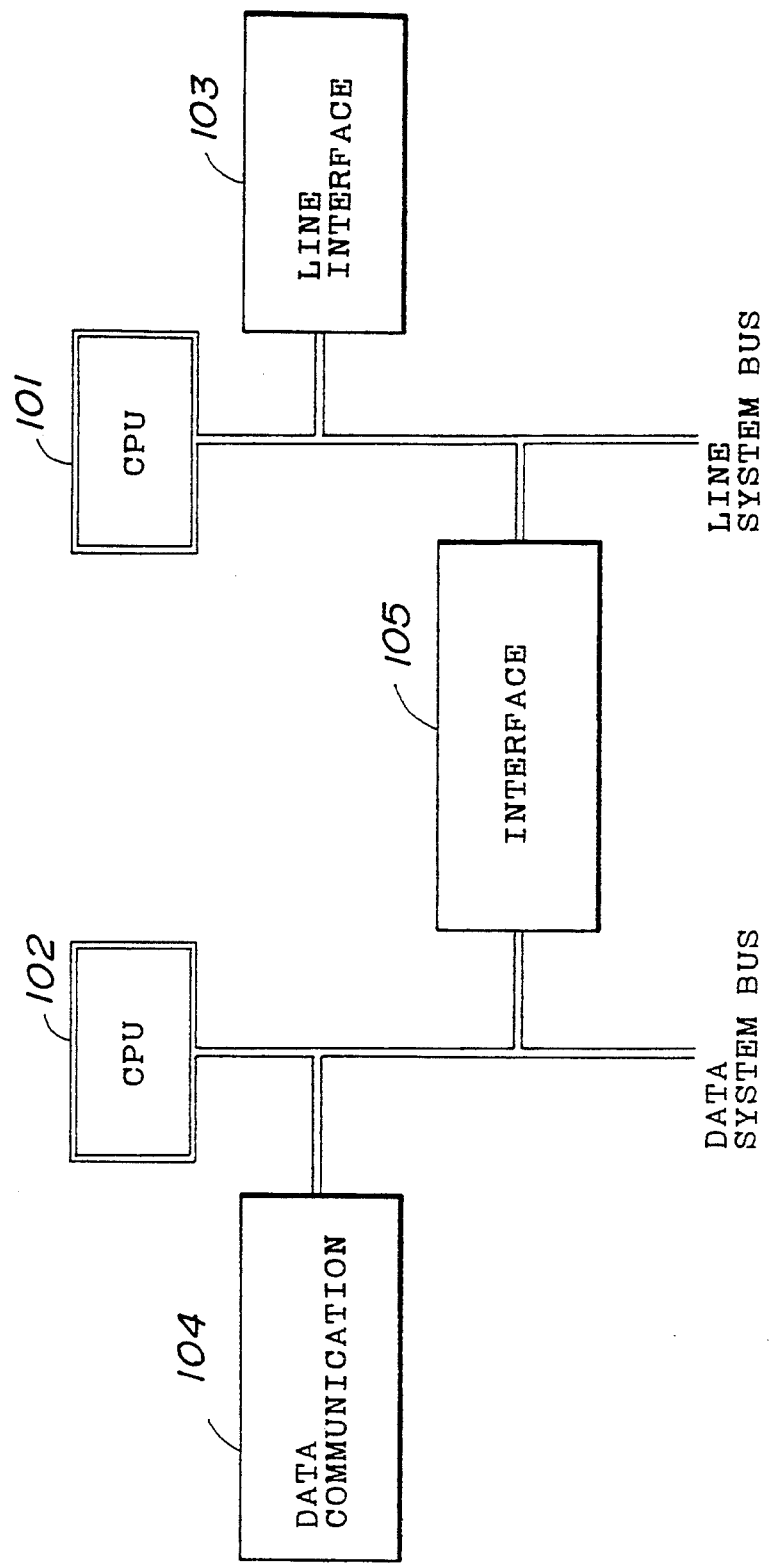
FIG. 1 is a system block diagram showing an example of a conventional communication control unit.

First, a description will be given of the operating principle of one aspect of the present invention, by referring to FIG. 2. The communication control unit shown in FIG. 2 includes a CPU 1 which is used as the core of the communication control unit, a CPU peripheral circuit part 2 which is required to operate the CPU 1, a line interface part 3 for carrying out a call control, a data communication part 4 for controlling a data terminal (not shown), an interprocessor interface part 5, and a bus selector part 6.

The CPU 1, the CPU peripheral circuit part 2 and the line interface part 3 are coupled via a line system bus 7. On the other hand, the data communication part 4 is coupled to a data system bus 8.

The interprocessor interface part 5 is provided between the line system bus 7 and the data system bus 8. The bus selector part 6 carries out a switching so as to take one of two routes, namely, a first route indicated by a solid line in which the interprocessor interface part 5 is bypassed and a second route indicated by a dotted line in which the interprocessor interface part 5 is included in the route.

When the bus selector part 6 selects the first route, a single mode in which the CPU 1 controls the line interface part 3 and the data communication part 4 is realized. On the other hand, when the bus selector part 6 selects the second route, a multi mode in which the CPU 1 controls the line interface part 3 and another CPU (not shown) controls the data communication part 4 via the data system bus 8 is realized.

Next, a description will be given of the operating principle of another aspect of the present invention, by referring to FIG. 3. In FIG. 3, those parts which are the same as those corresponding parts in FIG. 2 are designated by the same reference numerals, and a description thereof will be omitted.

The communication control unit shown in FIG. 3 additionally includes a second bus selector part 9 which is provided between the data communication part 4 and the data system bus 8.

Figure 2:
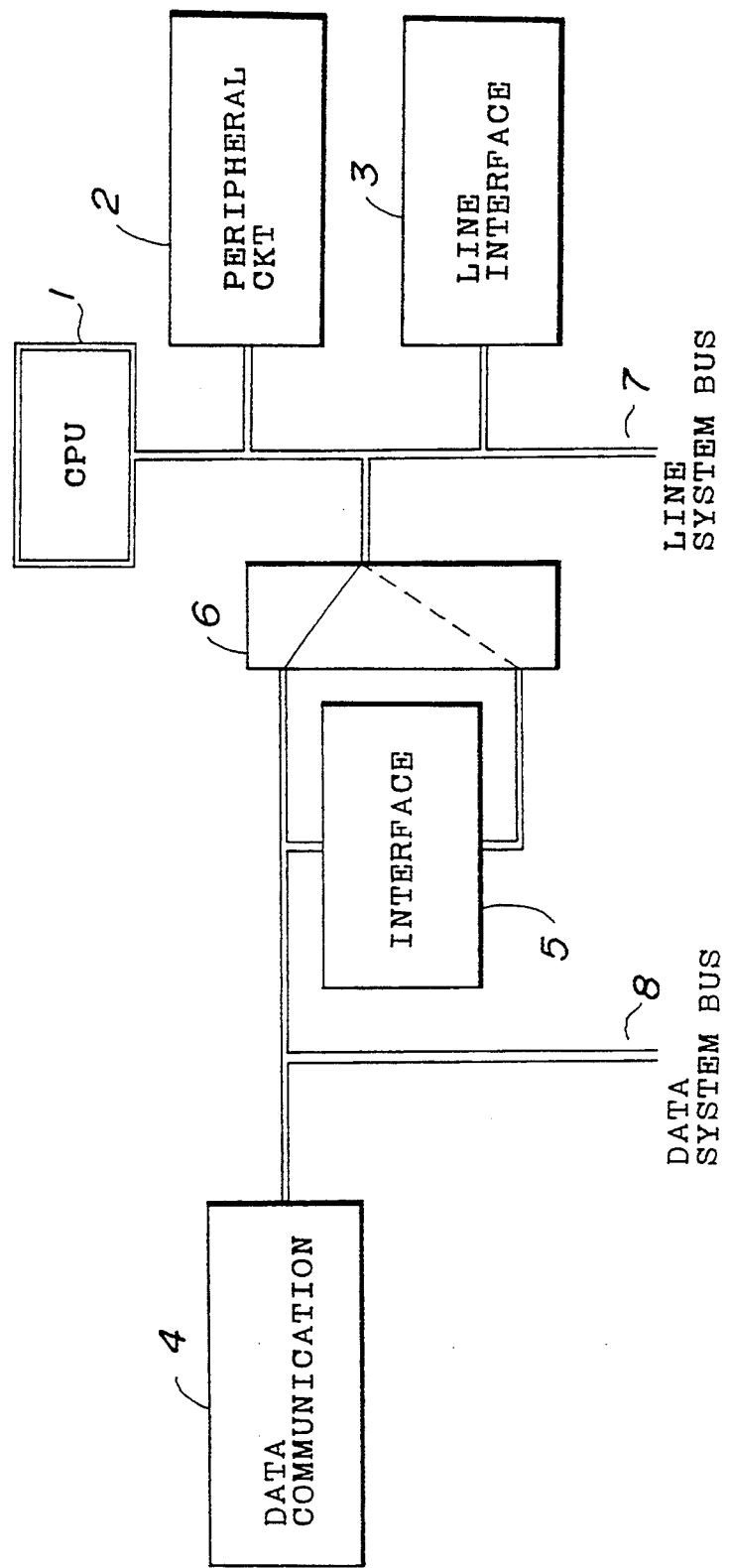
FIG. 2 is a system block diagram for explaining the operating principle of one aspect of the present invention.
Figure 3:
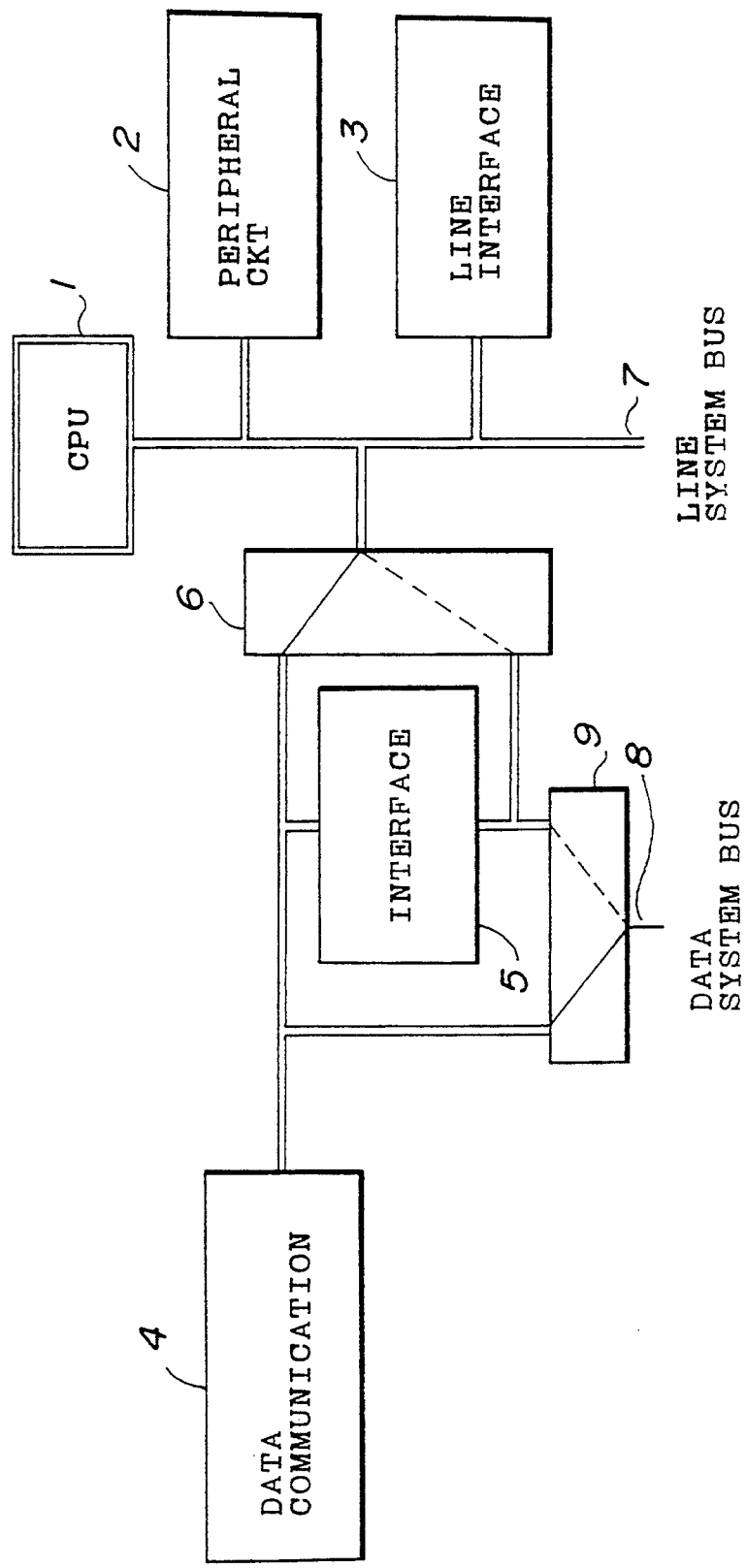
FIG. 3 is a system block diagram for explaining the operating principle of another aspect of the present invention.

The single mode described above can be realized by selecting the first route of the first bus selector part 6 similarly as in the case of the communication control unit shown in FIG. 2. On the other hand, the multi mode described above can be realized by selecting the second route of the first bus selector part 6 and selecting a third route of the second bus selector part 9 indicated by a solid line. The data communication part 4 is coupled to the data system bus when the third route of the second bus selector part 9 is selected.

Furthermore, when the first route of the first bus selector part 6 is selected and a fourth route of the second bus selector part 9 indicated by a dotted line is selected, a slave mode is realized. The interprocessor interface part 5 is coupled to the data system bus 8 when the fourth route of the second bus selector part 9 is selected. In the slave mode, the CPU 1 controls the data communication part 4, and the interprocessor interface part 5 can make a communication with another communication control unit.

Figure 4:
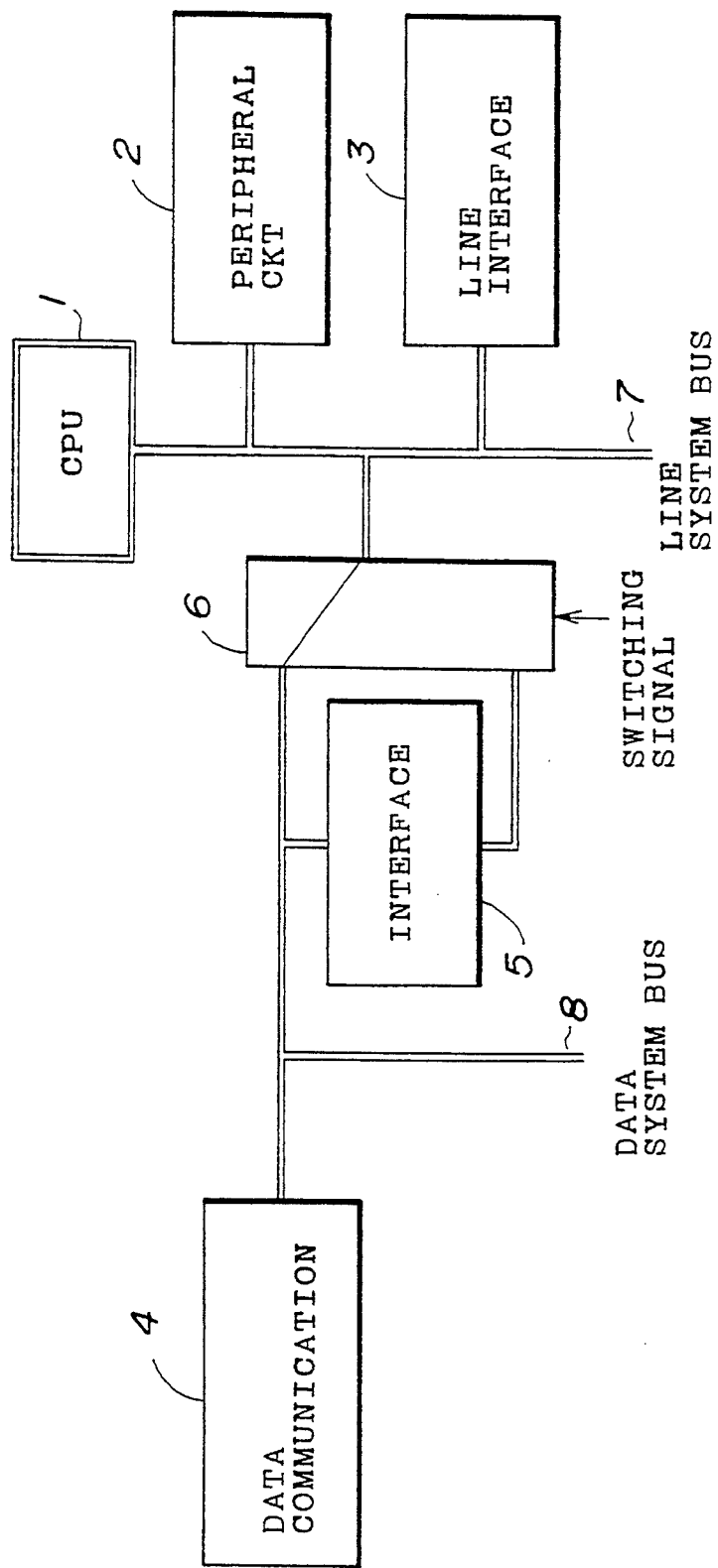
FIG. 4 is a system block diagram showing a first embodiment of the communication control unit according to the present invention in a single mode.
Figure 5:
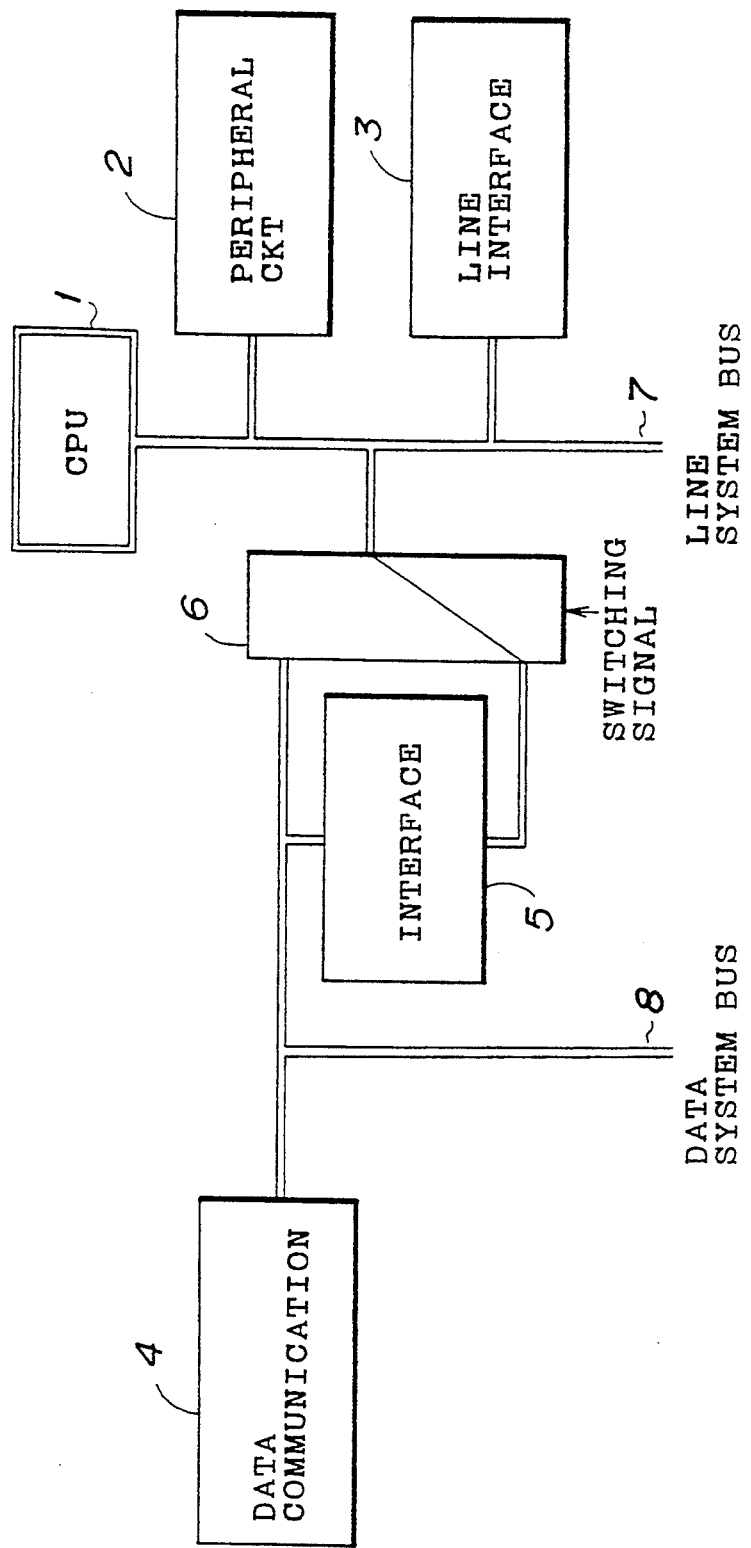
FIG. 5 is a system block diagram showing the first embodiment in a multi mode.

Next, a description will be given of a first embodiment of the communication control unit according to the present invention, by referring to FIGS. 4 and 5. In FIGS. 4 and 5, those parts which are the same as those corresponding parts in FIG. 2 are designated by the same reference numerals.

In FIGS. 4 and 5, the CPU 1, the CPU peripheral circuit part 2, the line interface part 3, the data communication part 4, the interprocessor interface part 5 and the bus selector part 6 are integrated on a single LSI chip, for example, using the ASIC technology.

The CPU 1 functions as the core of this communication control unit. The CPU peripheral circuit part 2 includes a timer circuit, an interrupt circuit and the like which are necessary to operate the CPU 1. The line interface part 3 carries out a call control. The CPU 1, the CPU peripheral circuit part 2 and the line interface part 3 are coupled via the line system bus 7.

The data communication part 4 controls the data terminal. This data communication part 4 is coupled to the data system bus 8.

The interprocessor interface part 5 is provided between the data communication part 4 and the CPU peripheral circuit part 2 and the line interface part 3, that is, between the data system bus 8 and the line system bus 7. For example, a dual port RAM is used as the interprocessor interface part 5.

The bus selector part 6 bypasses the interprocessor interface part 5 in the single mode as shown in FIG. 4, and couples the line system bus 7 and the data system bus 8 via the interprocessor interface part 5 in the multi mode as shown in FIG. 5.

Next, a description will be given of the single and multi modes of the communication control unit.

In the single mode, the load on the software is relatively small at the simple data terminal which uses a relatively simple procedure, and the CPU 1 controls both the line interface part 3 and the data communication part 4. As shown in FIG. 4, the bus selector part 5 is switched to bypass the interprocessor interface part 5 in the single mode. As a result, this embodiment of the communication control unit can be applied to the simple data terminal.

Figure 6:
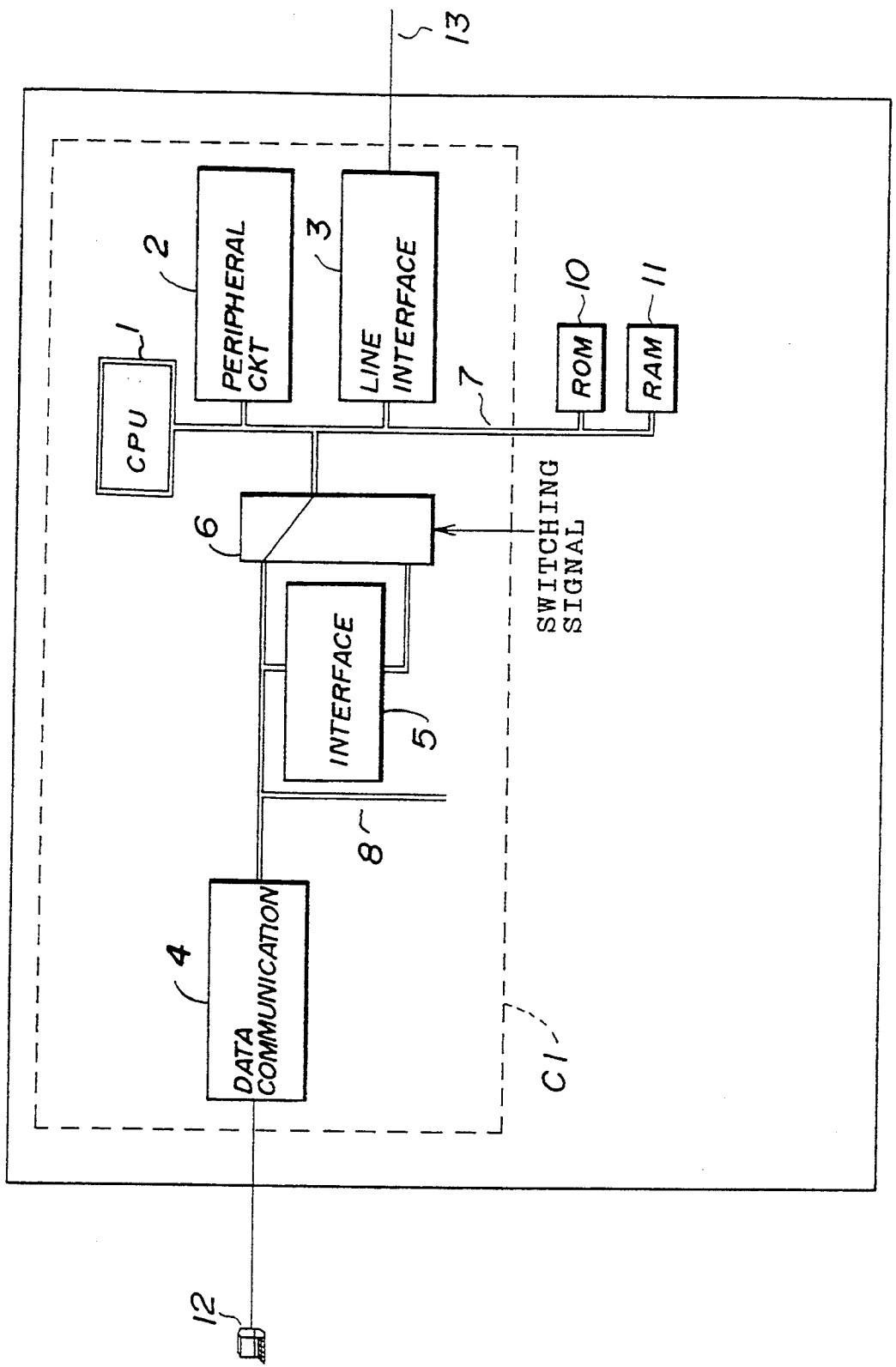
FIG. 6 is a system block diagram showing a simple data terminal applied with the first embodiment.

FIG. 6 shows a simple data terminal applied with the first embodiment. In FIG. 6, the first embodiment of the communication control unit is denoted by C1. A read only memory (ROM) 10 for storing programs and the like, and a RAM 11 for storing data, are coupled to the line system bus 7 of the communication control unit C1. A simple data terminal 12 is coupled to the data communication part 4 of the communication control unit C1, and a line 13 to the outside is coupled to the line interface part 3 of the communication control unit C1.

On the other hand, in the multi mode, the load on the software is relatively large at the complex data terminal which uses a relatively complicated procedure. In this multi mode, the CPU 1 controls the line interface part 3, and another external CPU controls the data communication part 4 via the data system bus 8. As shown in FIG. 5, the bus selector part 6 is switched to couple the line system bus 7 and the data system bus 8 via the interprocessor interface part 5 in the multi mode. As a result, this embodiment of the communication control unit can be applied to the complex data terminal.

Figure 7:
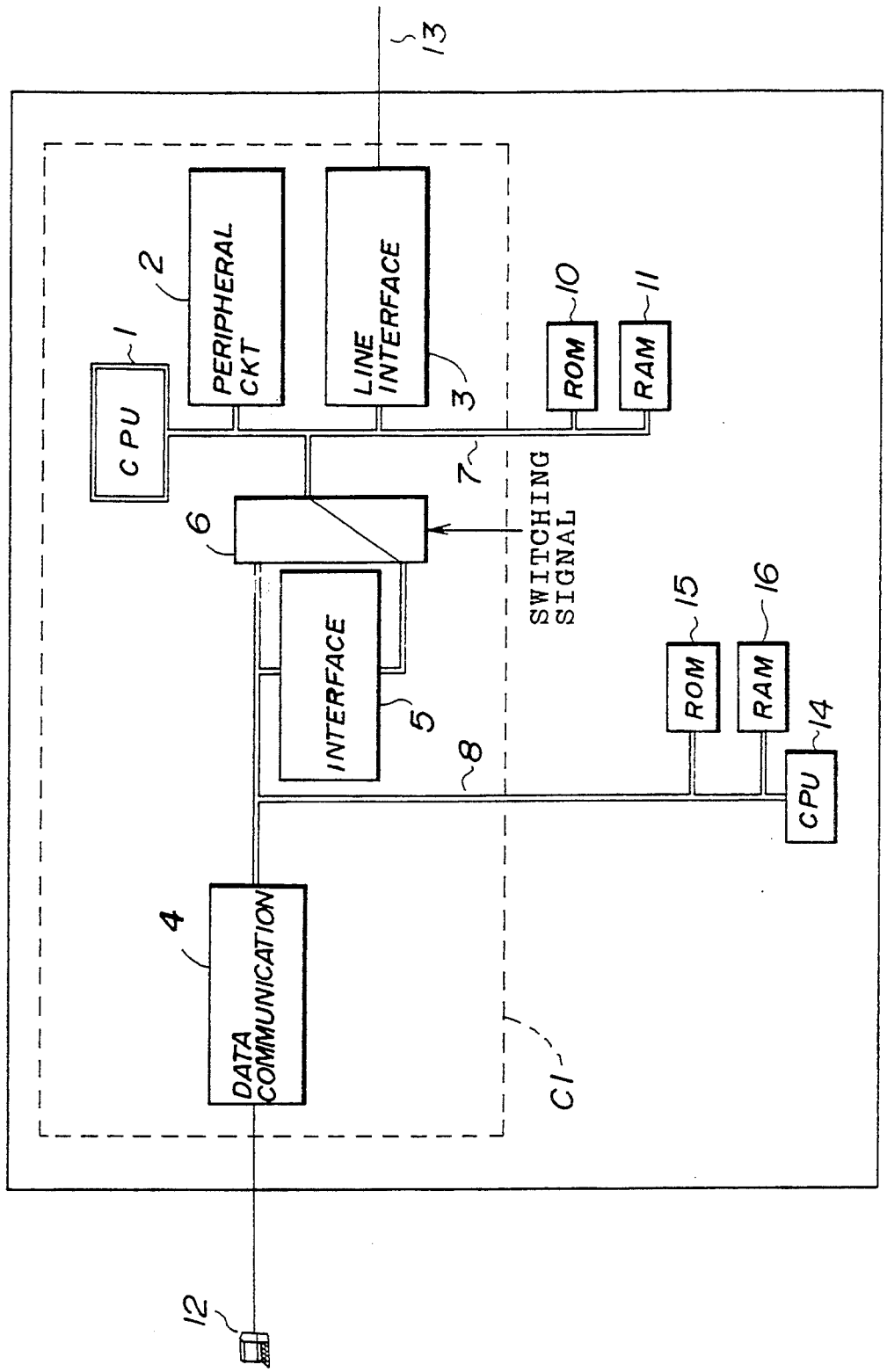
FIG. 7 is a system block diagram showing a complex data terminal applied with the first embodiment.

FIG. 7 shows a complex data terminal applied with the first embodiment. In FIG. 7, the same designations will be used as in FIG. 6. The ROM 10 for storing programs and the like and the RAM 11 for storing data are coupled to the line system bus 7 of the communication control unit C1. On the other hand, a complex data terminal 12 is coupled to the data communication part 4 of the communication control unit C1, and the line 13 to the outside is coupled to the line interface part 3 of the communication control unit C1. Furthermore, an external CPU 14, a ROM 15 for storing programs and the like, and a RAM 16 for storing data are coupled to the data system bus 8.

In this case, the line interface part 3 can be controlled by the CPU 1 within the communication control unit C1, and the data communication part 4 of the communication control unit C1 can be controlled by the external CPU 14 outside the communication control unit C1. In addition, the communication between the CPUs 1 and 14 in this state is made via the interprocessor interface part 5.

Therefore, the flexible architecture of the communication control unit enables selection of one of the single mode and the multi mode depending on the processing capacity of the software. For this reason, the communication control unit can cope with various types of data terminals including the simple data terminal and the complex data terminal.

Figure 8:
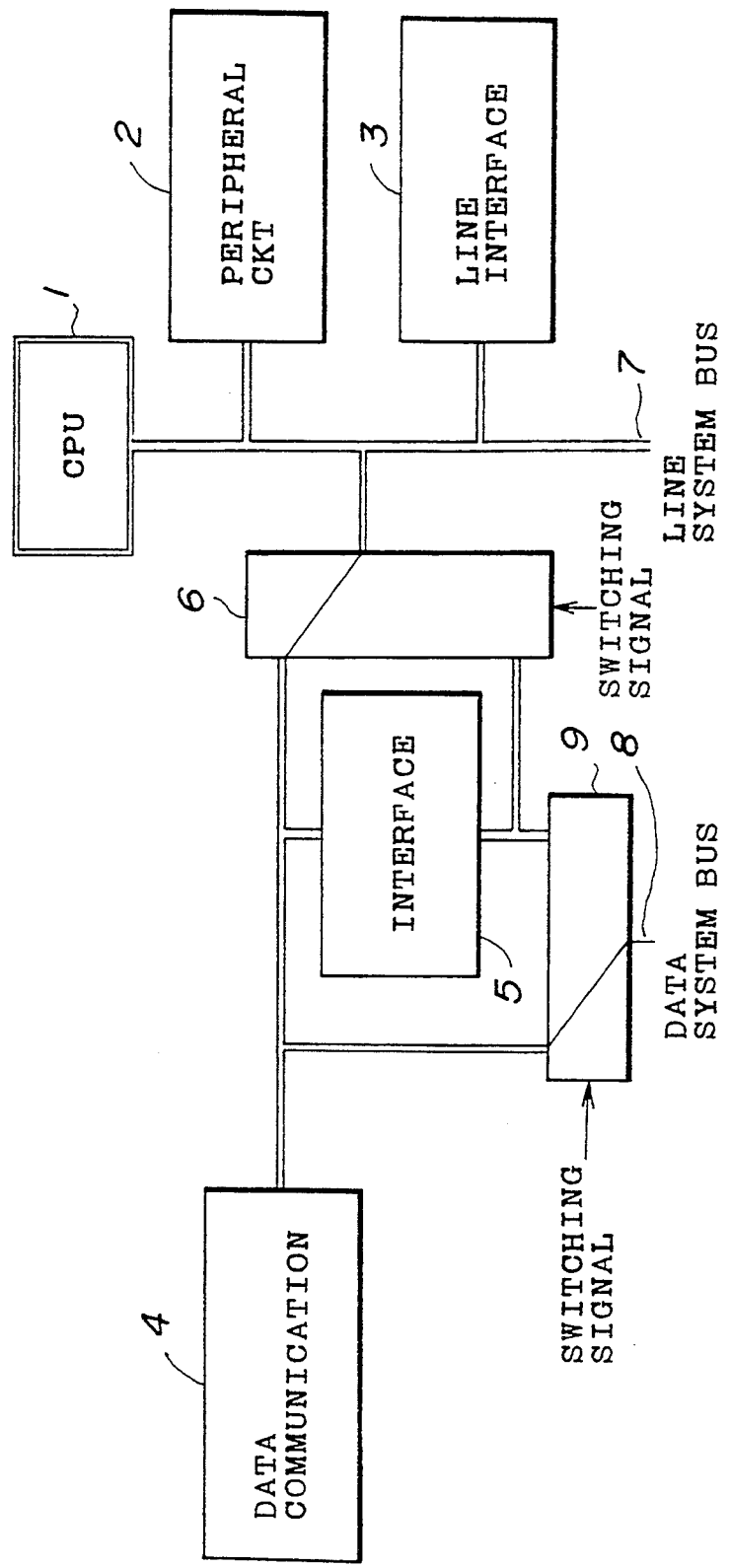
FIG. 8 is a system block diagram showing a second embodiment of the communication control unit according to the present invention in a single mode.
Figure 9:
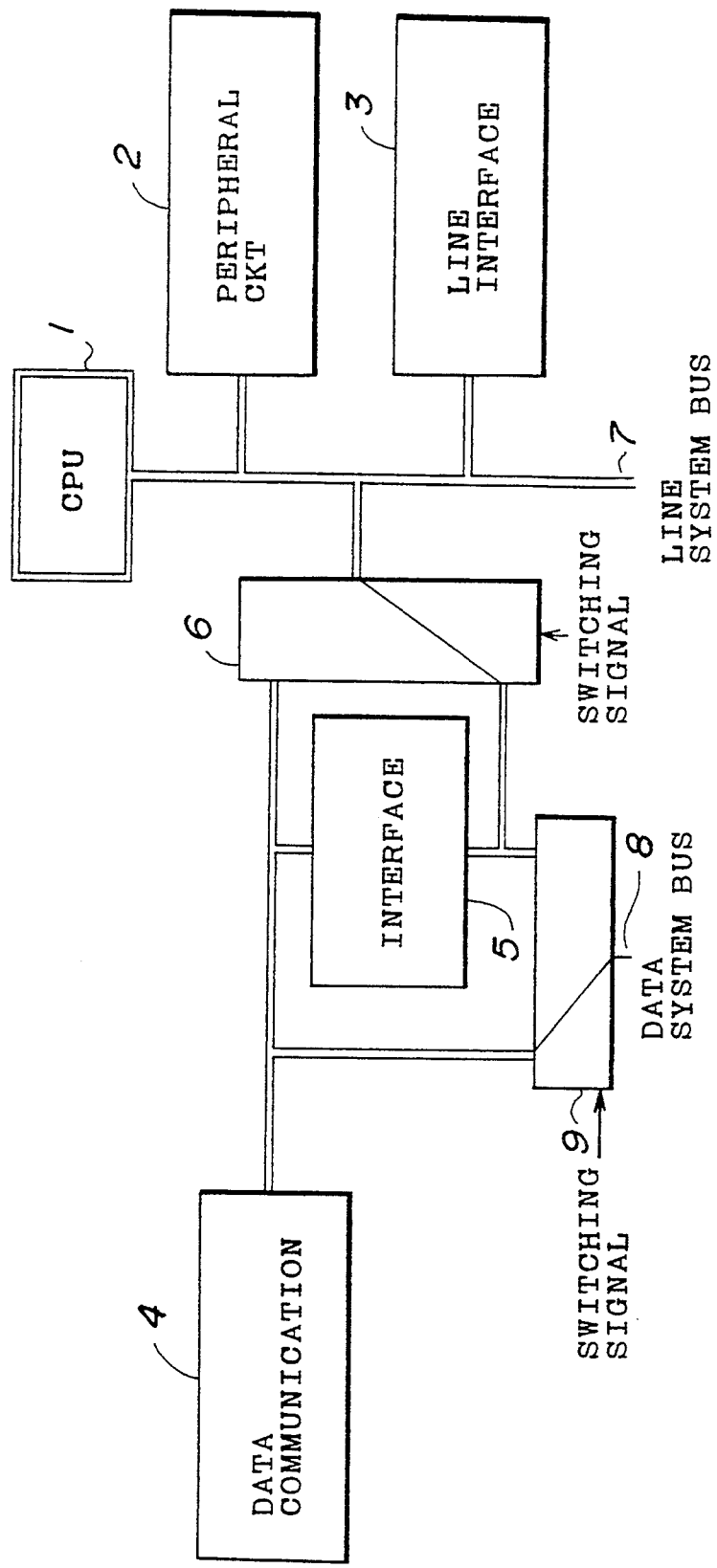
FIG. 9 is a system block diagram showing the second embodiment in a multi mode.
Figure 10:
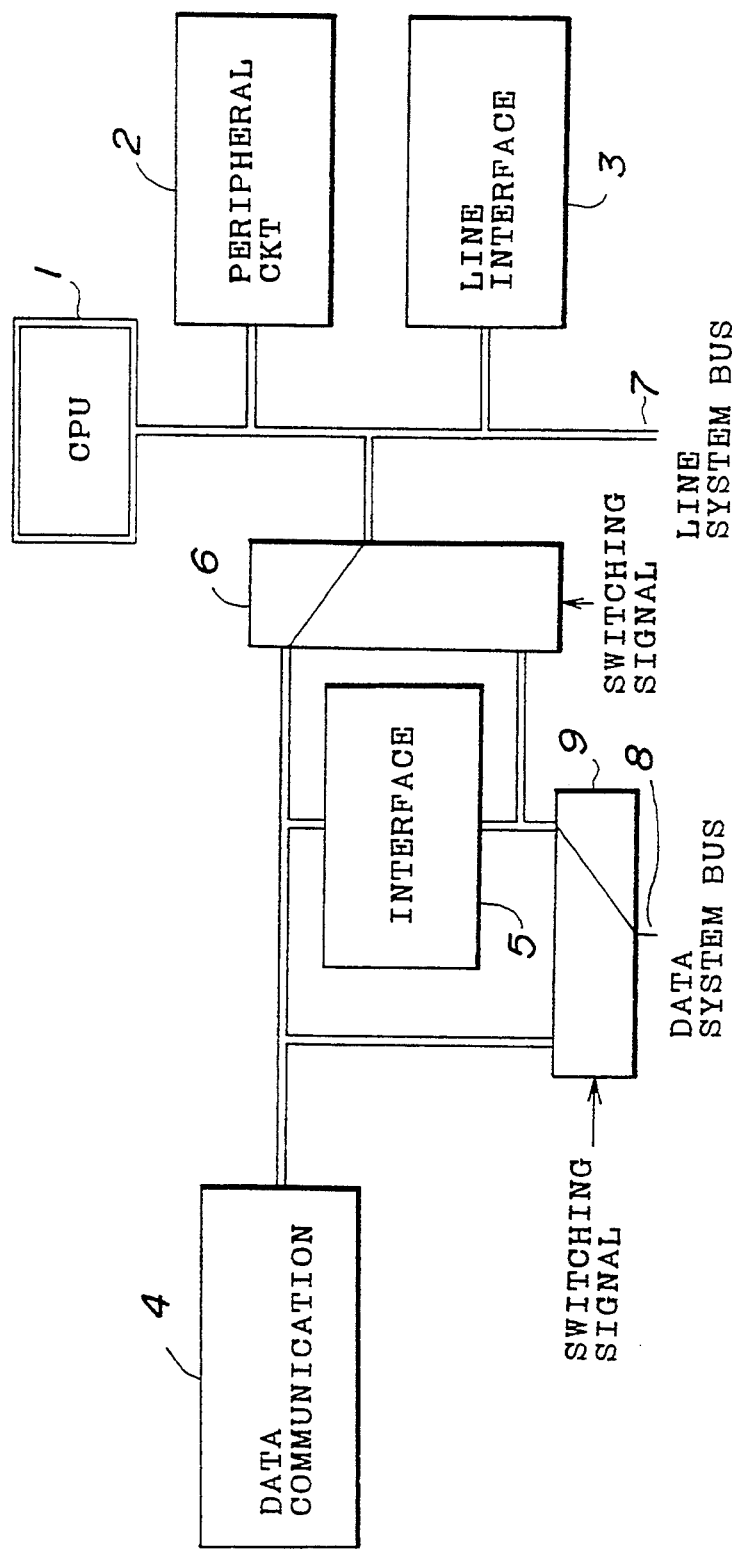
FIG. 10 is a system block diagram showing the second embodiment in a slave mode.

Next, a description will be given of a second embodiment of the communication control unit according to the present invention, by referring to FIGS. 8, 9 and 10. In FIGS. 8 through 10, those parts which are the same as those corresponding parts in FIG. 3 are designated by the same reference numerals.

As shown in FIGS. 8 through 10, the communication control unit includes the CPU 1, the CPU peripheral circuit part 2, the line interface part 3, the data communication part 4, the interprocessor interface part 5, and first and second bus selector parts 6 and 9 are integrated on a single LSI chip, for example, using the ASIC technology.

The CPU 1, the CPU peripheral circuit part 2, the line interface part 3, the data communication part 4, the interprocessor interface part 5 and the first bus selector part 6 are the same as those of the first embodiment described above, and a description thereof will be omitted.

This second embodiment is characterized by the second bus selector part 9. This second bus selector part 9 arranges the interprocessor interface part 5 between the data communication part 4 and the data system bus 8.

Next, a description will be given of the single, multi and slave modes of the communication control unit.

As described above, in the single mode, the load on the software is relatively small at the simple data terminal, and the CPU 1 within the communication control unit controls both the line interface part 3 and the data communication part 4. The first bus selector part 6 is switched to bypass the interprocessor interface part 5 in the single mode as shown in FIG. 8. In this state, the second bus selector part 9 is switched to bypass the interprocessor interface part 5. Hence, this embodiment may be applied to the simple data terminal as shown in FIG. 11.

Figure 11:
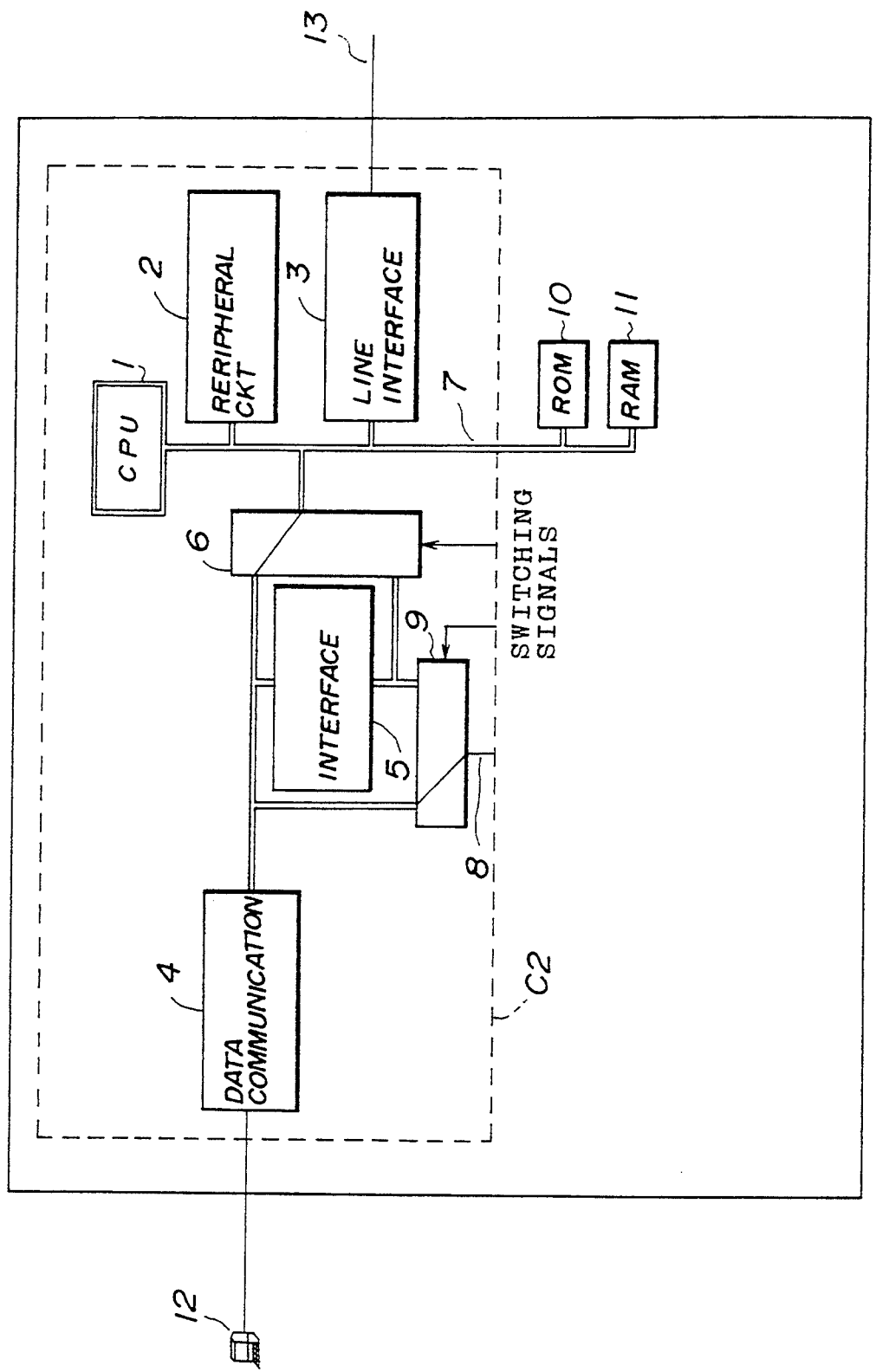
FIG. 11 is a system block diagram showing a simple data terminal applied with the second embodiment.

FIG. 11 shows a simple data terminal applied with the second embodiment. In FIG. 11, the second embodiment of the communication control unit is denoted by C2. A ROM 10 for storing programs and the like, and a RAM 11 for storing data, are coupled to the line system bus 7 of the communication control unit C2. A simple data terminal 12 is coupled to the data communication part 4 of the communication control unit C2, and a line 13 to the outside is coupled to the line interface part 3 of the communication control unit C2.

On the other hand, in the multi mode, the load on the software is relatively large at the complex data terminal which uses a relatively complicated procedure. In this multi mode, the CPU 1 controls the line interface part 3, and another external CPU controls the data communication part 4 via the data system bus 8. As shown in FIG. 9, the first bus selector part 6 is switched to couple the line system bus 7 and the data system bus 8 via the interprocessor interface part 5 in the multi mode. In this state, the second bus selector part 9 is switched so as to bypass the interprocessor interface part 5. As a result, this embodiment of the communication control unit can be applied to the complex data terminal.

Figure 12:
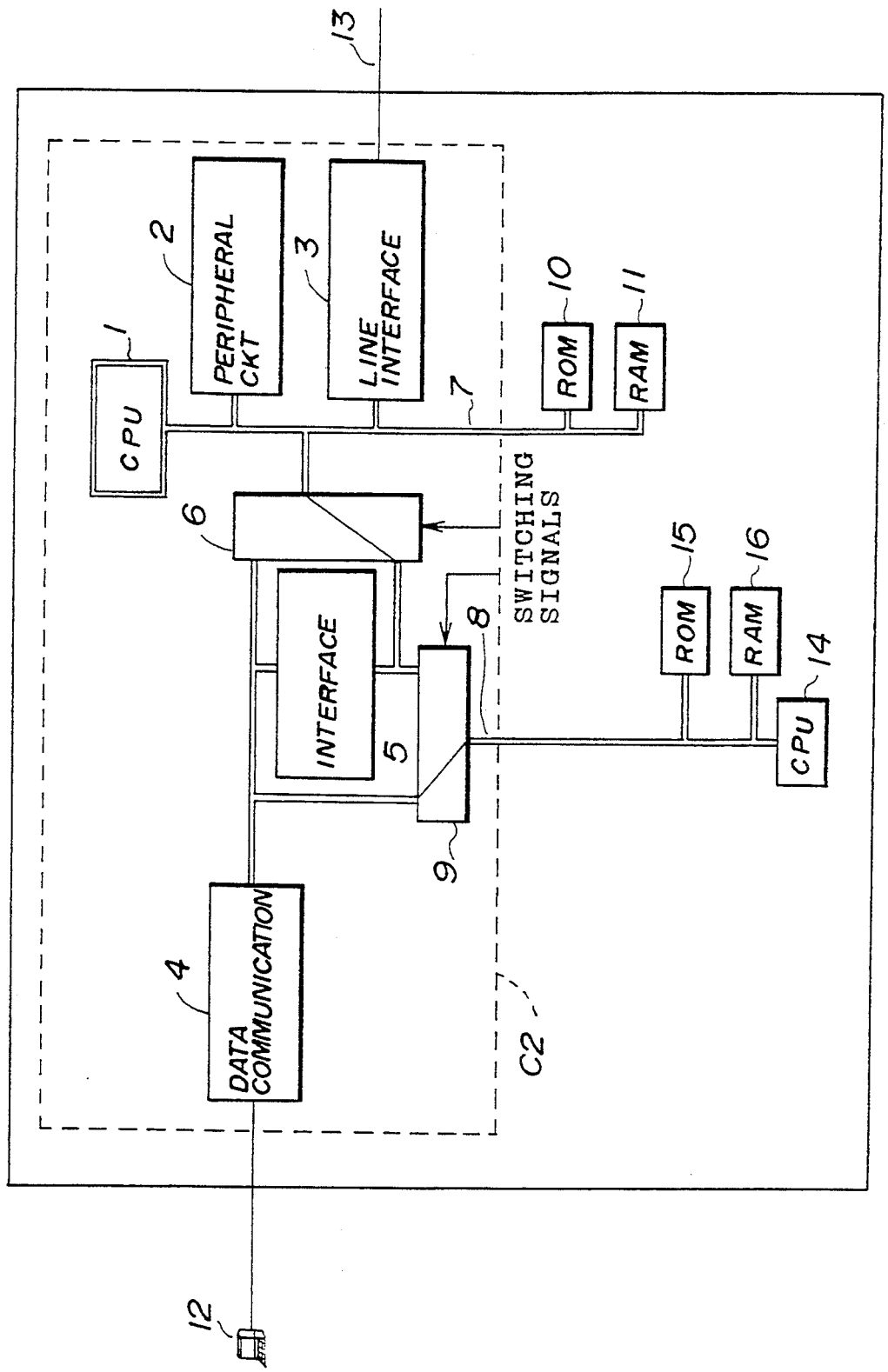
FIG. 12 is a system block diagram showing a complex data terminal applied with the second embodiment.

FIG. 12 shows a complex data terminal applied with the first embodiment. In FIG. 12, the same designations will be used as in FIG. 11. The ROM 10 for storing programs and the like and the RAM 11 for storing data are coupled to the line system bus 7 of the communication control unit C2. On the other hand, a complex data terminal 12 is coupled to the data communication part 4 of the communication control unit C2, and the line 13 to the outside is coupled to the line interface part 3 of the communication control unit C2. Furthermore, an external CPU 14, a ROM 15 for storing programs and the like, and a RAM 16 for storing data are coupled to the data system bus 8.

In this case, the line interface part 3 can be controlled by the CPU 1 within the communication control unit C2, and the data communication part 4 of the communication control unit C2 can be controlled by the external CPU 14 outside the communication control unit C2. In addition, the communication between the CPUs 1 and 14 in this state is made via the interprocessor interface part 5.

In the slave mode, the CPU 1 controls the data communication part 4 and a communication with another communication control unit can be made via the interprocessor interface part 5. As shown in FIG. 10, in the slave mode, the first bus selector part 6 is switched so as to bypass the interprocessor interface part 5 and the second bus selector part 9 is switched to couple the data communication part 4 to the data system bus 8 via the interprocessor interface part 5. As a result, this embodiment may be applied to a data terminal which has the slave mode, a plurality of ports and has data communication functions.

Figure 13:
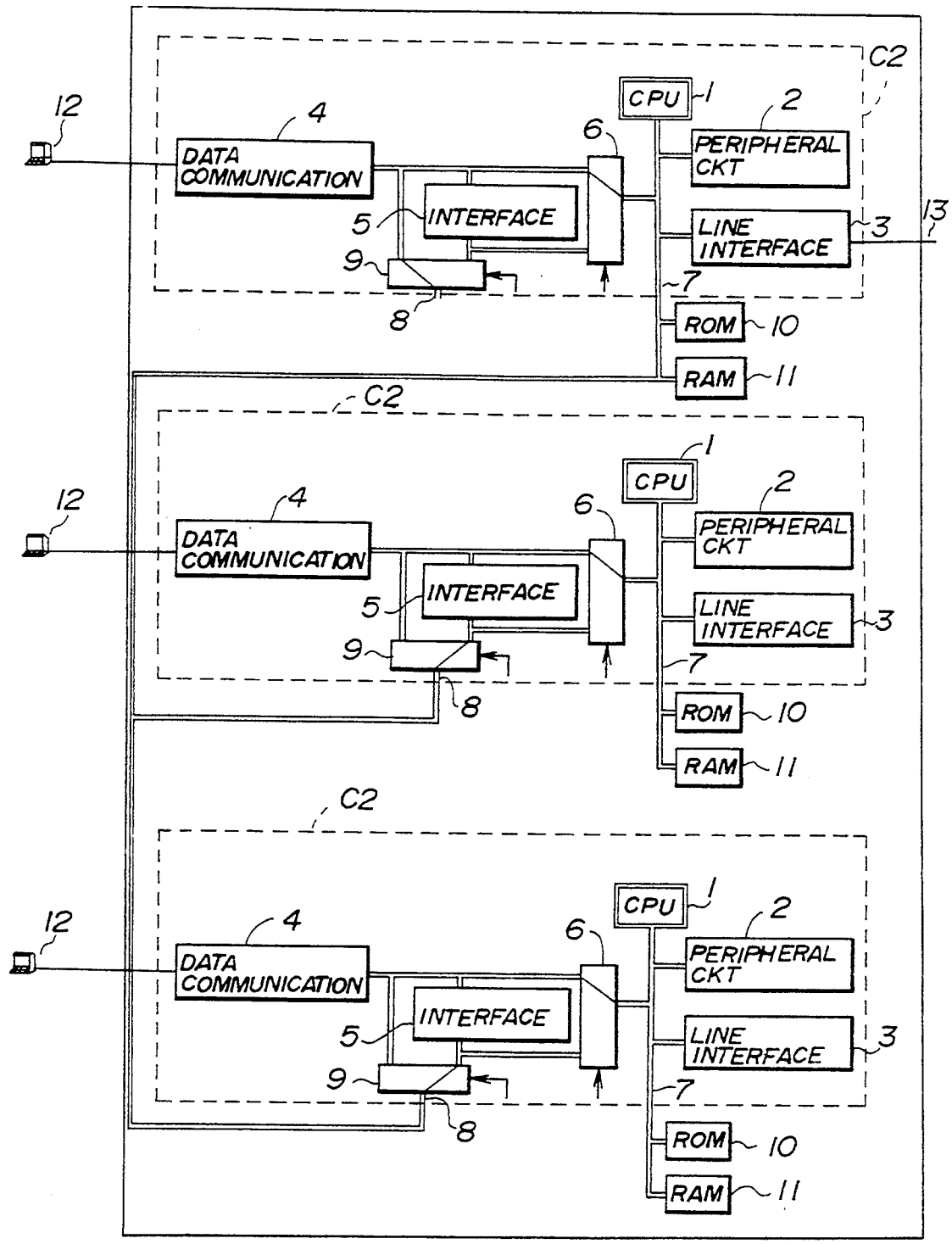
FIG. 13 is a system block diagram showing a data terminal having a plurality of ports and applied with the second embodiment.

FIG. 13 shows a data terminal having a plurality of ports and applied with the second embodiment. In FIG. 13, those parts which are the same as those corresponding parts in FIG. 11 are designated by the same reference numerals, and a description thereof will be omitted. In FIG. 13, the communication control unit C2 shown on the top is used in the single mode, while the lower two communication control units C2 are used in the slave mode.

In the lower two communication control unit C2 which is used in the slave mode, the CPU 1 controls the data communication part 4, and a communication can be made with another communication control unit via the interprocessor interface part 5.

Figure 14:
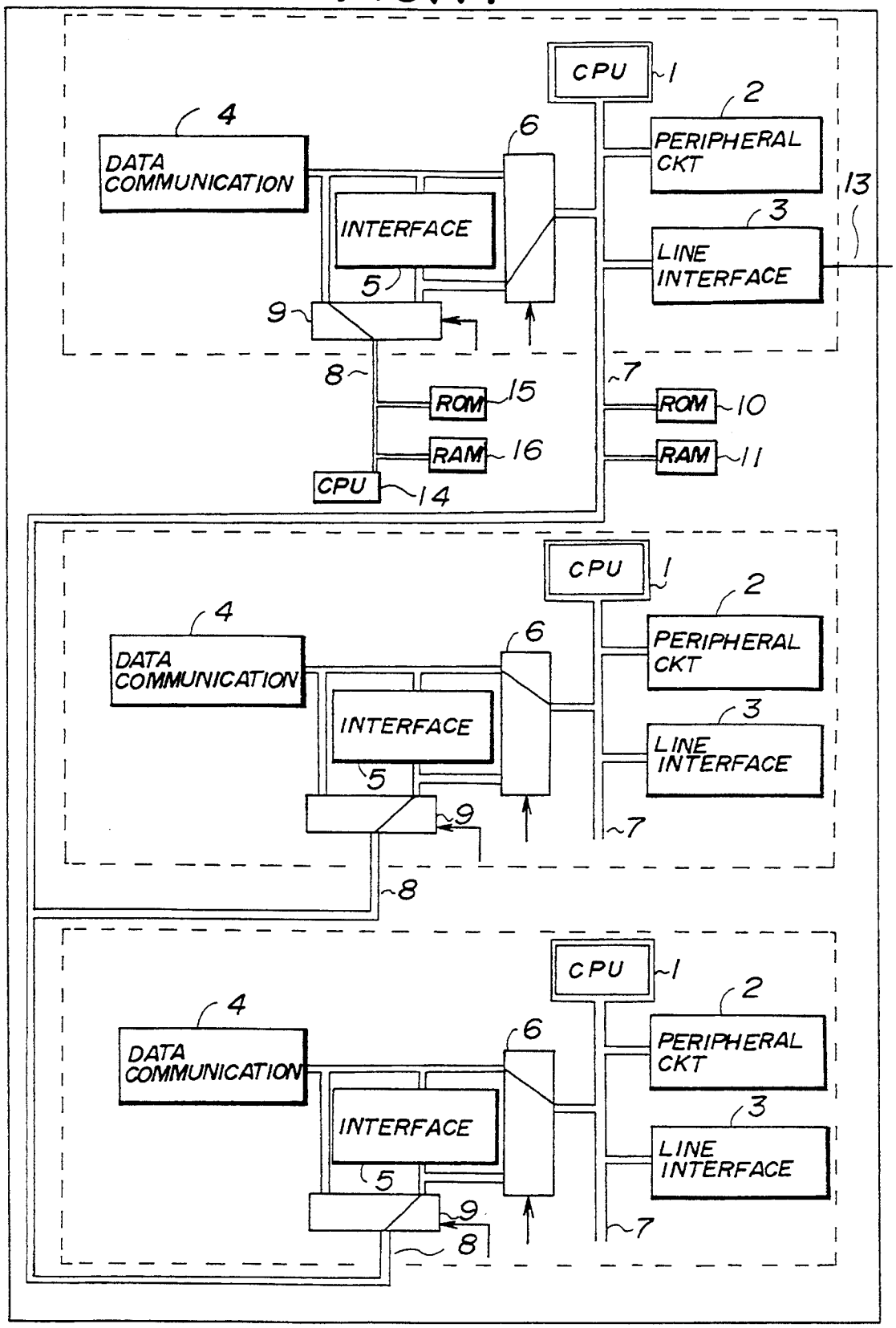
FIG. 14 is a system block diagram showing a data terminal having a plurality of ports and applied with the second embodiment.

FIG. 14 shows a telephone terminal having a data communication function and applied with the second embodiment. In FIG. 14, those parts which are the same as those corresponding parts in FIG. 12 are designated by the same reference numerals, and a description thereof will be omitted. In FIG. 14, the communication control unit C2 shown on the top is used in the multi mode, while the lower two communication control units C2 are used in the slave mode.

Figure 15:
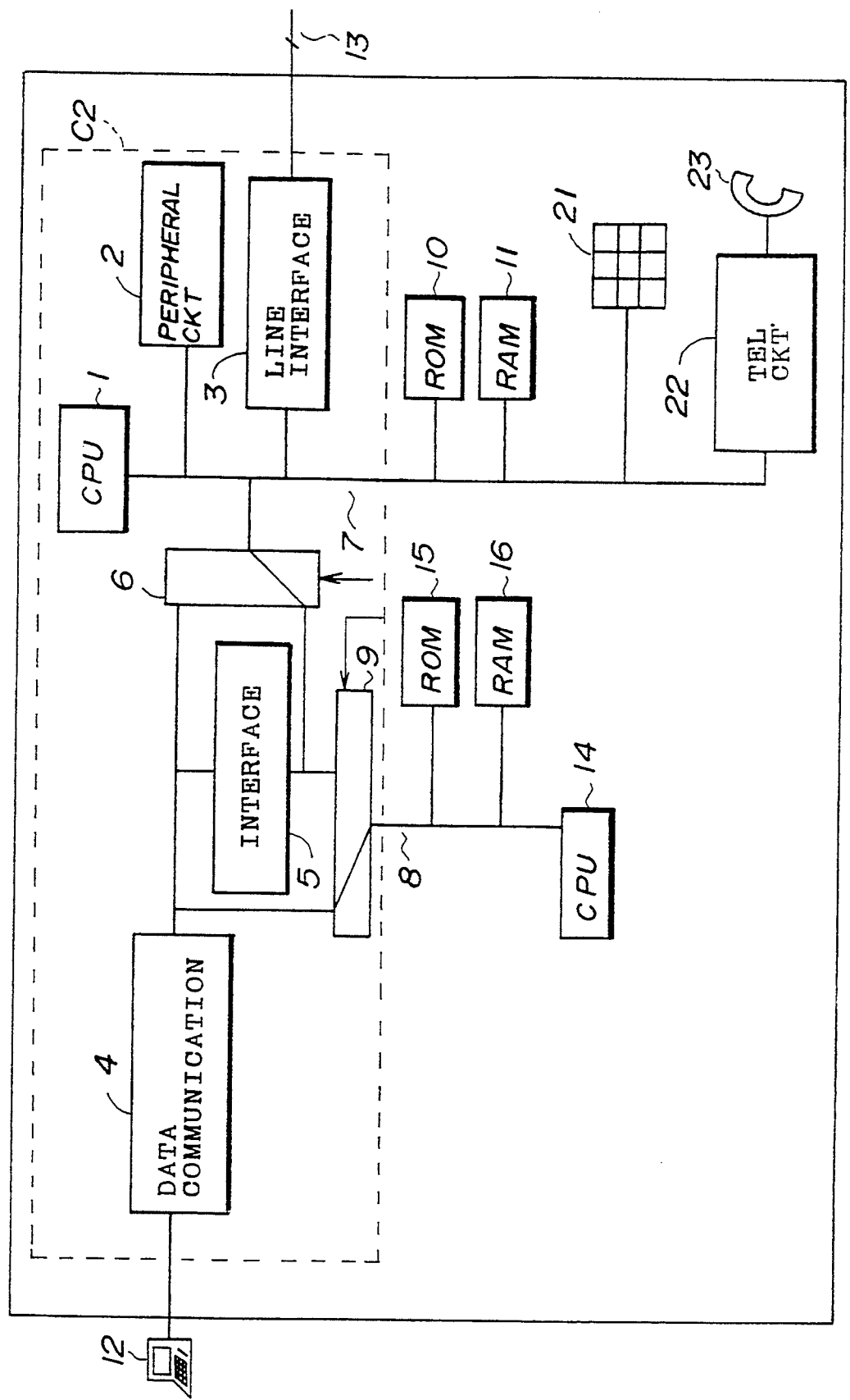
FIG. 15 is a system block diagram showing a telephone terminal having a data communication function and applied with the second embodiment.

In FIG. 15, the communication control unit C2 is used in the multi mode, and in addition to the ROM 10 and the RAM 11, a dialing key 21 and a telephone circuit 22 are coupled to the line system bus 7. A handset 23 is coupled to the telephone circuit 22. The dialing key 21, the telephone circuit 22 and the handset 23 form a telephone set.

Therefore, the flexible architecture of the communication control unit enables selection of one of the single mode, the multi mode and the slave mode depending on the processing capacity of the software. For this reason, one communication control unit can cope with various types of data terminals including the simple data terminal, the complex data terminal and the data terminal having a plurality of ports.

Figure 16:
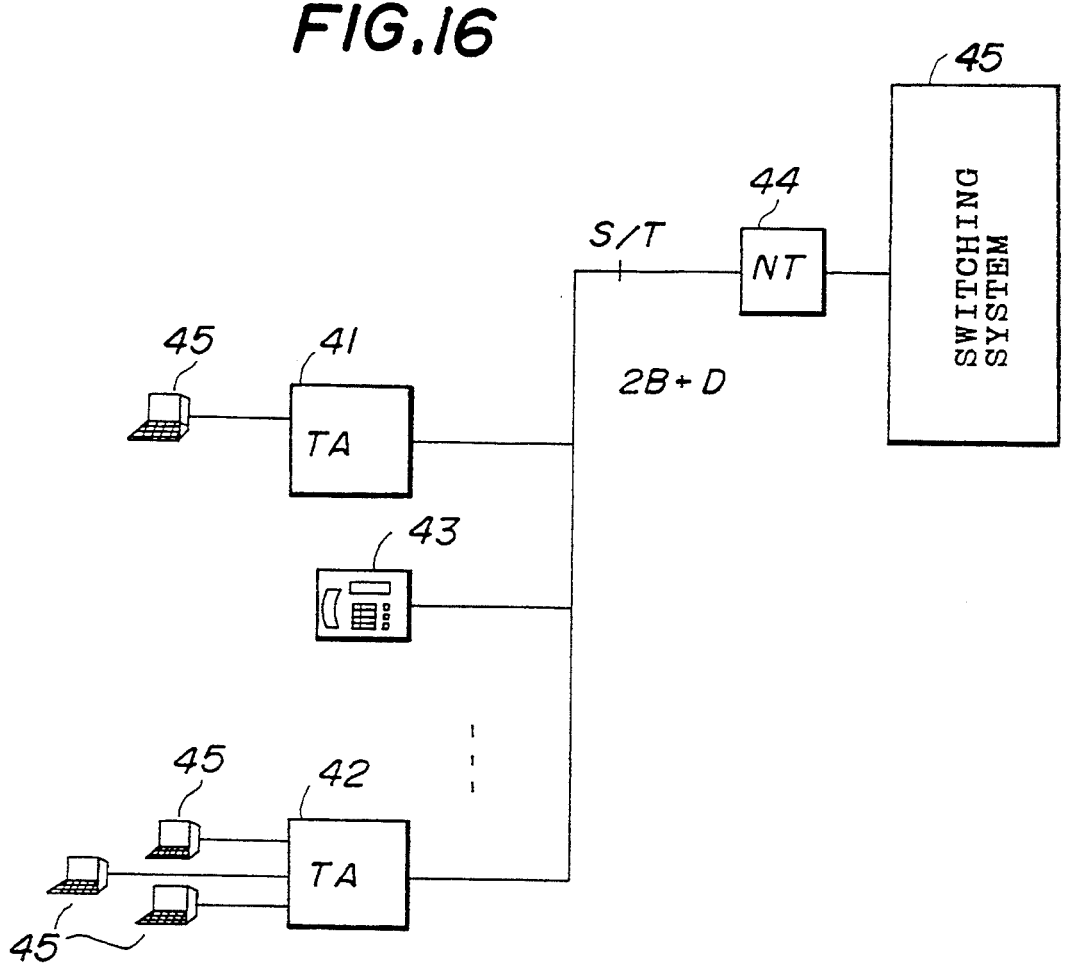
FIG. 16 is a system block diagram showing an ISDN structure.

FIG. 16 shows an ISDN structure including terminal adapters 41 and 42, a telephone set 43, a network termination 44 and an ISDN switching system 45 which are coupled as shown. A terminal 45 is coupled to the terminal adapter 41, while a plurality of terminals 45 are coupled to the terminal adapter 42. The communication control unit according to the present invention may be applied to the terminal adapters 41 and 42 of such an ISDN structure.

At the S/T point of the ISDN where 2B+D channels are used, up to eight terminal equipments may be connected. However, when a large number of data terminals is to be connected, it becomes necessary to couple a plurality of data terminals to the terminal adapter as in the case of the terminal adapter 42 shown in FIG. 16, so as to effectively utilize the limited number of terminal equipments which may be connected to the S/T point. Therefore, the communication control unit according to the present invention is particularly effective when applied to the terminal adapter 42 which couples to the plurality of data terminals 45.

In the embodiments described heretofore, the data communication part 4 may be realized by a V.110 rate adaption unit MB86440 manufactured by Fujitsu Limited. As shown in an application of the manual of the V.110 rate adaption unit MB86440, the CPU 1 may be realized by an MCU. The line interface part 3 may be realized by an ISDN terminal S interface unit MB86405 manufactured by Fujitsu Limited.

In addition, the interprocessor interface part 5 may be realized by a first-in-first-out (FIFO) buffer.

Figure 17:
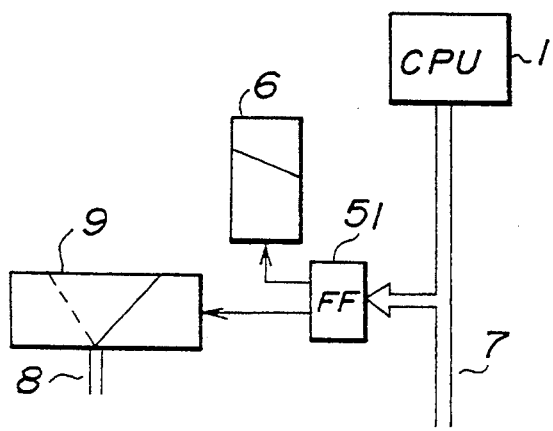
FIG. 17 is a system block diagram showing an embodiment of a method of controlling the bus selector parts.

In the described embodiments, it is assumed for the sake of convenience that the switching states of the first and second bus selector parts 6 and 9 are respectively controlled by an external switching signal. However, other means of controlling the first and second bus selector parts 6 and 9 may be employed. FIG. 17 shows an embodiment of a method which uses a flip-flop or register 51. In FIG. 17, those parts which are the same as those corresponding parts in FIGS. 8 through 10 are designated by the same reference numerals, and a description thereof will be omitted. According to this method, control information for controlling the switching state of the first and second bus selector parts 6 and 9 is supplied to the register 51 from the CPU 1 via the line system bus 7. Hence, the switching state of the first and second bus selector parts 6 and 9 is controlled based on the control information received from the register 51.

Further, the present invention is not limited to these embodiments, but various variations and modifications may be made without departing from the scope of the present invention.

What is claimed is:

1. A communication control unit comprising:
 a central processing unit;
 a line system bus connected to said central processing unit;
 a peripheral circuit part connected to said line system bus for operating the central processing unit;
 a line interface part coupled to said line bus system and for carrying out control of a call signal received therefrom;
 a data communication part for controlling a data terminal;
 said line system bus coupling the central processing unit, the peripheral circuit part and the line interface part;
 a data system bus which is coupled to the data communication part;
 an interprocessor interface part which is coupled to the data communication part; and
 a bus selector part which is coupled to the line system bus, the data communication part and the interprocessor interface part,
 said bus selector part bypassing the interprocessor interface part and coupling the line system bus to the data communication part in a single mode in which the central processing unit controls both the line interface part and the data communication part;
 said bus selector part coupling the line system bus to the data communication part via the interprocessor interface part in a multi mode in which the central processing unit controls the line interface part and another central processing unit controls the data communication part via the data system bus.

2. The communication control unit as claimed in claim 1, wherein the line interface part is coupled to an external line.

3. The communication control unit as claimed in claim 2, wherein the external line is coupled to a S/T point of an integrated services digital network.

4. The communication control unit as claimed in claim 1, wherein the central processing unit, the peripheral circuit part, the line interface part, the data communication part, the interprocessor interface part and the bus selector part are formed on a single large scale integrated circuit chip.

5. The communication control unit as claimed in claim 1, which further comprises first memory means for storing programs and second memory means for storing data, said first and second memory means being coupled to the line system bus.

6. The communication control unit as claimed in claim 5, which further comprises third memory means for storing programs and fourth memory means for storing data, said third and fourth memory means and said other central processing unit being coupled to the data system bus.

7. The communication control unit as claimed in claim 1, wherein the bus selector part is switched responsive to an external switching signal.

8. The communication control unit as claimed in claim 1, wherein the bus selector part is switched responsive to control information output from the central processing unit.

9. A communication control unit comprising:
a central processing unit;
a line system bus coupled to said processing unit;
a peripheral circuit part connected to said line system bus for operating the central processing unit;
a line interface part coupled to said line system bus for carrying out control of a call signal received therefrom;
a data communication part for controlling a data terminal;
said line system bus coupling the central processing unit, the peripheral circuit part and the line interface part;
an interprocessor interface part which is coupled to the data communication part;
a first bus selector part which is coupled to the line system bus, the data communication part and the interprocessor interface part;
a second bus selector part which is coupled to the first bus selector part, the interprocessor interface part and the data communication part; and
a data system bus which is coupled to the second bus selector part,
said first bus selector part bypassing the interprocessor interface part and coupling the line system bus to the data communication part in a single mode in which the central processing unit controls both the line interface part and the data communication part;
said first bus selector part coupling the line system bus to the data communication part via the interprocessor interface part in a multi mode in which the central processing unit controls the line interface part and another central processing unit controls the data communication part via the data system bus,
said second bus selector part bypassing the interprocessor interface part and coupling the data system bus to the data communication part in the single and multi modes,
said second bus selector part coupling the data system bus to the data communication part via the interprocessor interface part in a slave mode in which the interprocessor interface part makes a communication with another communication control unit, said first bus selector part bypassing the interprocessor interface part to couple the line system bus to the data communication part in the slave mode.

10. The communication control unit as claimed in claim 9, wherein the line interface part is coupled to an external line.

11. The communication control unit as claimed in claim 10, wherein the external line is coupled to a S/T point of an integrated services digital network.

12. The communication control unit as claimed in claim 9, wherein the central processing unit, the peripheral circuit part, the line interface part, the data communication part, the interprocessor interface part, and the first and second bus selector parts are formed on a single large scale integrated circuit chip.

13. The communication control unit as claimed in claim 9, which further comprises first memory means for storing programs and second memory means for storing data, said first and second memory means being coupled to the line system bus.

14. The communication control unit as claimed in claim 13, which further comprises third memory means for storing programs and fourth memory means for storing data, said third and fourth memory means and said other central processing unit being coupled to the data system bus.

15. The communication control unit as claimed in claim 9, wherein the first and second bus selector parts are switched responsive to an external switching signal.

16. The communication control unit as claimed in claim 9, wherein the first and second bus selector parts are switched responsive to control information output from the central processing unit.

17. The communication control unit as claimed in claim 9, which further comprises a telephone set which is coupled to the line system bus.

18. A communication control system which includes a plurality of communication control units, each of said communication control units having identical constructions comprising:
a central processing unit;
a line system bus coupled to said central processing unit;
a peripheral circuit part for operating the central processing unit;
a line interface part coupled to said line system bus for carrying out control of a call signal received therefrom;
a data communication part for controlling a data terminal;
said line system bus coupling the central processing unit, the peripheral circuit part and the line interface part;
an interprocessor interface part which is coupled to the data communication part;
a first bus selector part which is coupled to the line system bus, the data communication part and the interprocessor interface part; and
a second bus selector part which is coupled to the first bus selector part, the interprocessor interface part and the data communication part,
said first bus selector part bypassing the interprocessor interface part and coupling the line system bus to the data communication part in a single mode in which the central processing unit controls both the line interface part and the data communication part;
said first bus selector part coupling the line system bus to the data communication part via the interprocessor interface part in a multi mode in which the central processing unit controls the line interface part and another central processing unit controls the data communication part via the data system bus,
said second bus selector part bypassing the interprocessor interface part and coupling the data system bus to the data communication part in the single and multi modes,
said second bus selector part coupling the data system bus to the data communication part via the interprocessor interface part in a slave mode in which the interprocessor interface part makes a communication with another communication control unit, said first bus selector part bypassing the interprocessor interface part to couple the line system bus to the data communication part in the slave mode, an arbitrary one of the communication control units being used in the single mode while other remaining communication control units are used in the slave mode, the line system bus of said arbitrary communication control unit being coupled to the data system buses of said other remaining communication control units.

19. The communication control system as claimed in claim 18, wherein the line interface part of said arbitrary communication control unit is coupled to an external line.

20. The communication control system as claimed in claim 19, wherein the external line is coupled to a S/T point of an integrated services digital network.

21. The communication control system as claimed in claim 18, wherein the central processing unit, the peripheral circuit part, the line interface part, the data communication part, the interprocessor interface part and the bus selector part of each communication control unit are formed on a single large scale integrated circuit chip.

22. The communication control system as claimed in claim 18, which further comprises first memory means for storing programs and second memory means for storing data, a said first memory means and a said second memory means being coupled to the line system bus of each communication control unit.

23. The communication control system as claimed in claim 18, wherein the first and second bus selector parts of each communication control unit are switched responsive to an external switching signal.

24. The communication control system as claimed in claim 18, wherein the first and second bus selector parts of each communication control unit are switched responsive to control information output from the central processing unit of the corresponding communication control unit.

25. A communication control system which includes a plurality of communication control units, each of said communication control units having identical constructions comprising:

a central processing unit;

a line bus system coupled to said central processing unit;

a peripheral circuit part for operating the central processing unit;

a line interface part coupled to said line bus system for carrying out control of a call signal received therefrom;

a data communication part for controlling a data terminal;

said line system bus coupling the central processing unit, the peripheral circuit part and the line interface part;

an interprocessor interface part which is coupled to the data communication part;

a first bus selector part which is coupled to the line system bus, the data communication part and the interprocessor interface part; and a second bus selector part which is coupled to the first bus selector part, the interprocessor interface part and the data communication part, said first bus selector part bypassing the interprocessor interface part and coupling the line system bus to the data communication part in a single mode in which the central processing unit controls both the line interface part and the data communication part;

said first bus selector part coupling the line system bus to the data communication part via the interprocessor interface part in a multi mode in which the central processing unit controls the line interface part and another central processing unit controls the data communication part via the data system bus, said second bus selector part bypassing the interprocessor interface part and coupling the data system bus to the data communication part in the single and multi modes, said second bus selector part coupling the data system bus to the data communication part via the interprocessor interface part in a slave mode in which the interprocessor interface part makes a communication with another communication control unit, said first bus selector part bypassing the interprocessor interface part to couple the line system bus to the data communication part in the slave mode, an arbitrary one of the communication control units being used in the multi mode while other remaining communication control units are used in the slave mode, the line system bus of said arbitrary communication control unit being coupled to the data system buses of said other remaining communication control units.

26. The communication control system as claimed in claim 25, wherein the line interface part of said arbitrary communication control unit is coupled to an external line.

27. The communication control system as claimed in claim 26, wherein the external line is coupled to a S/T point of an integrated services digital network.

28. The communication control system as claimed in claim 25, wherein the central processing unit, the peripheral circuit part, the line interface part, the data communication part, the interprocessor interface part and the bus selector part of each communication control unit are formed on a single large scale integrated circuit chip.

29. The communication control system as claimed in claim 25, which further comprises first memory means for storing programs and second memory means for storing data, a said first memory means and a said second memory means being coupled to the line system bus of each communication control unit.

30. The communication control unit as claimed in claim 29, which further comprises third memory means for storing programs and fourth memory means for storing data, said third and fourth memory means and said other central processing unit being coupled to the data system bus.

31. The communication control system as claimed in claim 25, wherein the first and second bus selector parts of each communication control unit are switched responsive to an external switching signal.

32. The communication control system as claimed in claim 25, wherein the first and second bus selector parts of each communication control unit are switched responsive to control information output from the central processing unit of the corresponding communication control unit.

* * * * *